3,490,467
METHOD OF MONITORING AND MAINTAINING CONCENTRATION OF DEPLETABLE WORK SOLUTIONS
William H. Gore, Brookfield, and Paul E. Leising, Milwaukee, Wis., and Edward B. Tooper, Cincinnati, Ohio, assignors to Intercontinental Chemical Corporation, Cincinnati, Ohio, a corporation of Ohio
Application July 11, 1966, Ser. No. 567,341, now Patent No. 3,319,637, dated May 16, 1967, which is a continuation-in-part of application Ser. No. 517,585, Dec. 30, 1965. Divided and this application Feb. 23, 1967, Ser. No. 645,075
Int. Cl. B08b 3/08; C23g 1/36
U.S. Cl. 134—18    1 Claim

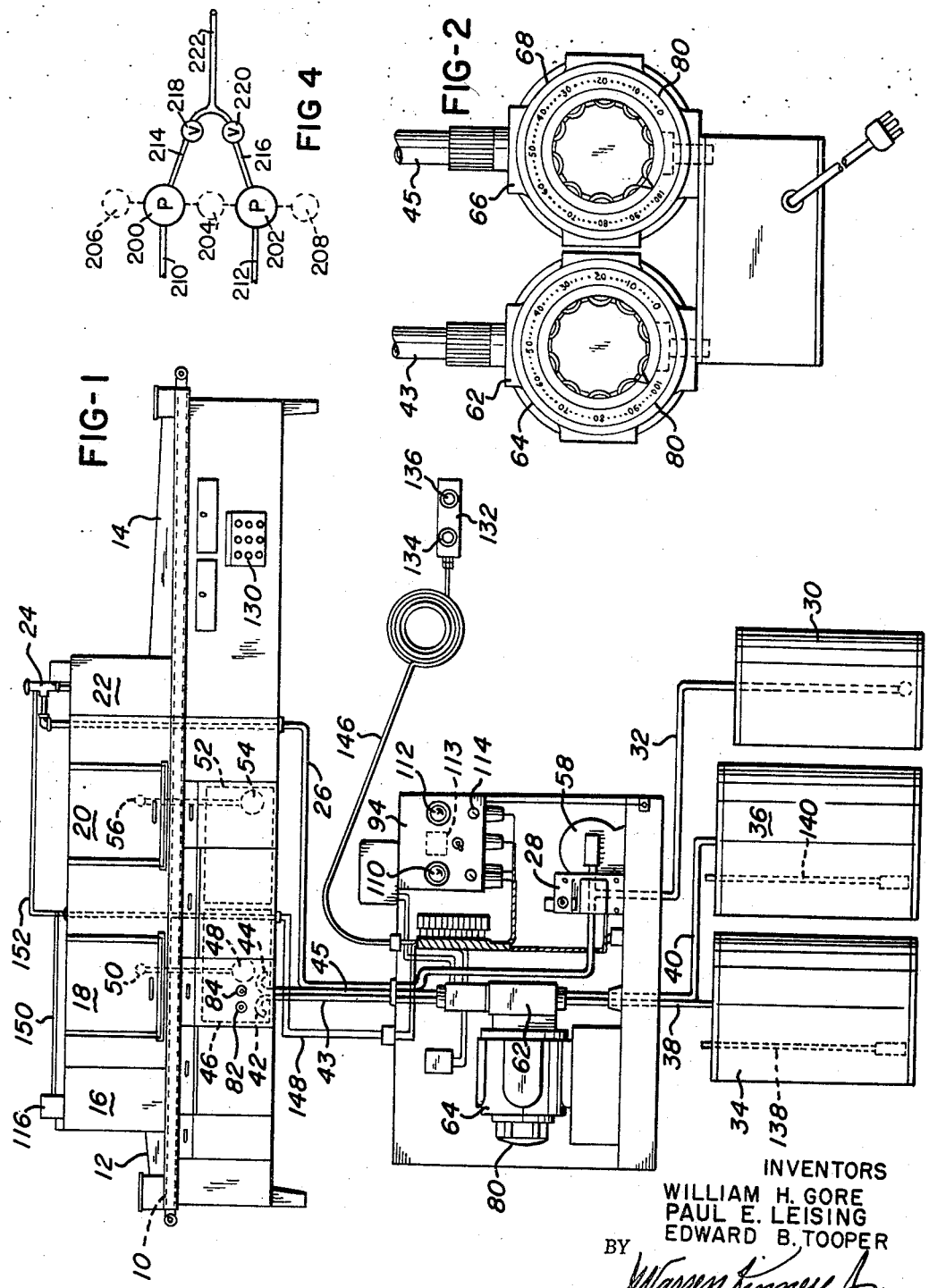

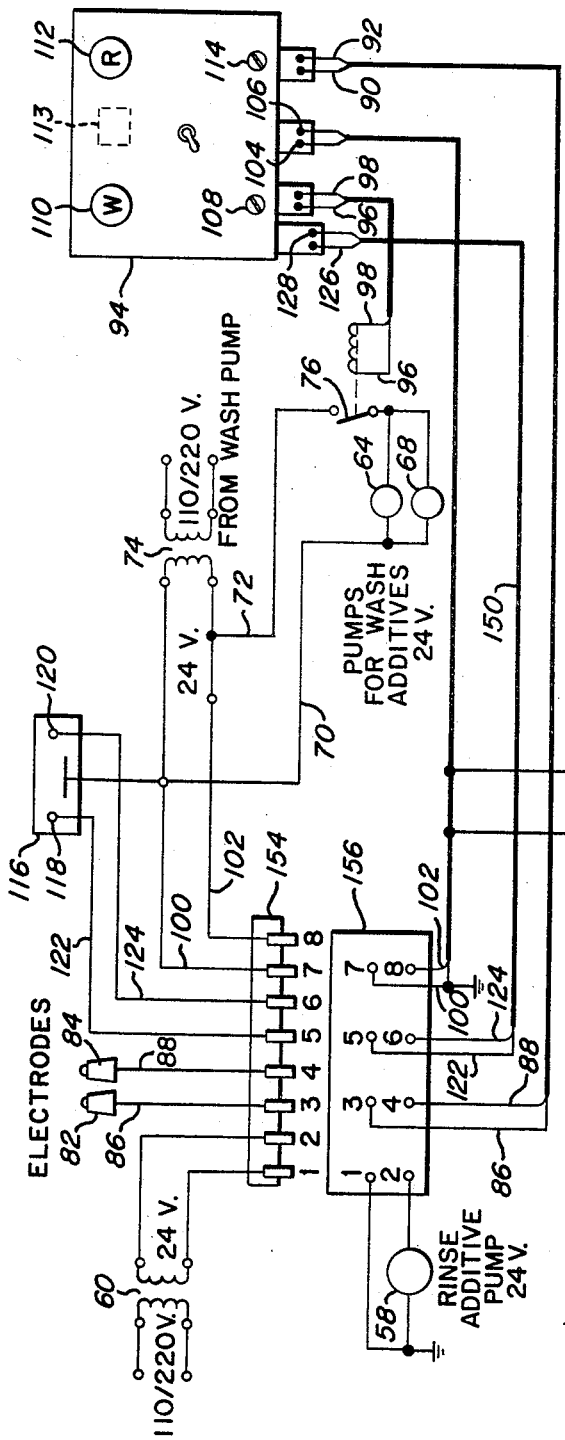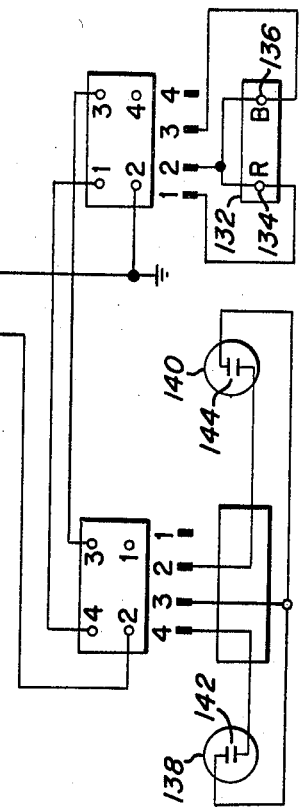

ABSTRACT OF THE DISCLOSURE

Method of washing articles by subjecting them to an aqueous work solution containing two or more liquid chemical additives which are normally incompatible in their concentrated forms but compatible at use dilutions, which comprises the steps of adding concentrated additives to said solution in such relative proportions to provide the solution with a predetermined concentration of said additives at use dilutions, and of thereafter maintaining the relative proportions of said additives at a predetermined concentration within said solution.

---

This invention is a division of application Ser. No. 567,341, filed July 11, 1966, now Patent No. 3,319,637, issued May 16, 1967, which in turn is a continuation-in-part of our co-pending application Ser. No. 517,585, filed Dec. 30, 1965, now abandoned.

This invention relates to methods of and apparatus for providing a work solution comprising two or more liquid compounds which may or may not be normally compatible but which are collectively necessary to accomplish a particular job.

Another object of the invention is to provide an improved technique for automatically dispensing such liquid compounds in proper, predetermined, but variable proportions and at an optimum concentration for chosen results.

Another object of the invention is directed to the choice and composition of two or more liquid compounds which may be normally compatible or not, but which when blended at or just prior to their being introduced as additives into a work solution will provide that solution with certain predetermined characteristics.

A further object of the invention relates to a method of and means for automatically and continuously monitoring the concentration of a depletable work solution and of automatically supplying additives in the form of liquid compounds, to the solution whenever its concentration falls below a predetermined value.

The present invention is also directed to control means for various types of devices which utilize a work solution constituting a prescribed concentration of two or more liquid compounds. The subject devices require for their effective performance the addition of one or more liquid compounds to the work solution, in such manner as to automatically maintain a prescribed concentration of additive materials in the work solution during the entire cycle of the particular device.

Solely by way of example, and not by way of restriction, the present invention is particularly adapted to the following applications each of which utilize work solutions containing liquid ingredients which may or may not be normally compatible when concentrated.

(A) Dishwashing: In commercial dishwashing operations it is desirable to provide a work solution which contains alkaline and bleaching additives as well as a low-foaming wetting agent to improve the overall washability of the solution and to reduce foaming to a minimum since foam impairs the "Impingment energy" of the solution which results in an impairment of the cleaning ability of the solution.

As a practical matter the composition of the work solution for each and every dishwasher installation differs, since the type of contamination and the composition of the contaminents present on the items or utensils to be cleaned en route through the dishwasher differs.

Heretofore when granule or powder additives were utilized they were blended to accommodate "an average" condition with the result that optimum efficiency and economy was rarely, if ever, attained.

(B) Water curtain: The effectiveness of water curtains, such as, by way of example, in paint spraying operations is greatly enhanced when alkaline materials are added to the water to coagulate the paint particles. However, the use of such additives presents serious foaming problems which can be minimized if not completely eliminated by the addition of de-foamer compounds to the work solution constituting the water curtain. As a practical matter each water curtain installation has different requirements as to the proper proportions of additives and the optimum concentration of such additives in the work solution for the desired results.

(C) Iron phosphatizing: At the present time iron phosphatizing is accomplished by adding acid salts, such as mono sodium phosphate, in granular form to the treating solution.

The present invention contemplates the controlled addition of solvents, wetting agents and acid, all in liquid form, to the treating or work solution whereby to permit an infinite ratio of the various ingredients as determined by each particular job.

(D) Zinc phosphatizing: Heretofore zinc phosphatizing has presented the same problems which are inherent with iron phosphatizing. The present invention contemplates the controlled addition of zinc materials, a wetting agent and sodium nitrite, all in liquid form in the particular proportions best suited for the particular zinc phosphatizing operation.

(E) Bakery utensil cleaning: The presence of deposits of proteins and carbohydrates on bakery equipment, including bake pans presents not only a serious cleaning but also a serious foaming problem. The present invention contemplates the controlled addition of a low foaming organic ingredient and an inorganic type ingredient, said ingredients being normally incompatable, wherein the ratio of additives to the work solution is determined by each particular job.

(F) Bottle washing: Bottle washing as commercially practiced in dairies, soft drink bottlers, breweries, and the like, entails the use of a two to three percent solution of caustic soda for cleansing and the use of certain compounds to control scale deposits. In addition, the use of organic defoamers is often required for optimum results. The present invention contemplates the controlled addition of caustic soda and non-compatable de-foaming agents in such a manner as to solve the particular problems encountered in each particular bottle washing machine.

(G) Storage and truck tanks: In the brewery and dairy industry storage and truck tanks are normally cleaned by means of high velocity spray equipment which, however, produces a serious foaming problem. The present invention contemplates the controlled addition of a de-foamer solution to the material discharged through the spray equipment.

(H) Car washing: Powdered detergents are presently widely used in commercial car washing operations, however the present invention contemplates the use of a two-component solution, the ingredients of which would be automatically controlled thereby eliminating the need of make-up tanks and the like.

(I) Paint stripping: The present invention contemplates the proper ratio and controlled addition of caustic soda and accelerators for providing a "custom made" solution for each particular paint stripping operation.

(J) Paper mill felt cleaning: For efficient operation, paper mill felts must be kept clean and porous, however in normal use the felts become plugged with pitch, tar, paper fibrils and the like. Felts are customarily cleaned by subjecting them to alternate acid and alkaline treatments. The present invention contemplates a system wherein the provision of and alternation between acid and alkaline is greatly simplified, and the present invention also contemplates the controlled addition of suitable wetting agents with alkalines or acids for providing an effective work solution or cleaning compound.

(K) Lubrication of chains in bottling plants: Heretofore various types of soaps have been used as chain lubricants; however, such soaps react with water hardness requiring the use of an expensive sequestering agent, such as EDTA. It is also highly desirable that the chain, per se, be cleaned, but the soap which has been selected for its lubricating qualities is not an efficient chain cleaner unless non-ionic wetting agents are also utilized.

The present invention contemplates the provision of a pre-blended surfactant and/or sequestering agents in minimum amounts needed to effectively satisfy the various problems required of an ideal chain lubricant.

(L) Industrial sprayers or washers: The present invention contemplates controlled addition of expensive surfactants, solvents and de-foamers to the liquid cleaning concentrate.

(M) Steam cleaning: In steam cleaning it is desirable to not only clean but to control the formation of scale in the steam cleaning machine. It is also desirable to add substantial amounts of surfactants. The additives or ingredients normally used in steam cleaning are incompatable except in very dilute amounts. The present invention contemplates the controlled addition of such incompatable ingredients thereby enhancing the overall effectiveness of the steam cleaning process.

From the foregoing illustrative examples and applications it will be noted that the subject invention enables the particular needs of each customer and/or piece of equipment to be properly and individually filled. That is, in each instance a tailor-made work solution is prepared and thereafter the proportion of ingredients and the concentration of said solution are maintained at all times. Solely by way of example, and in order to present one concrete example of the manner in which the present invention may be practiced reference will now be made to the application of the invention to a commercial dishwasher.

It has been common practice to furnish commercial washers with controls mounted directly thereon, or in the immediate vicinity thereof, to regulate the feed of additives. Such controls are readily accessible to attendants in charge of operation of the washers, and accordingly, the performance and efficiency of operation of the washer depended to a great extent upon the training and judgment of the attendants in charge. Some attendants of course were careless or indifferent, or lacked the fundamental technical understanding of washing solution depletion under varying operating conditions. As a result, some washers produced performance records which were very unsatisfactory, indicating low operating efficiency and high operating cost, or perhaps a low standard of cleansing performance dangerous to the public health.

An object of the present invention is to improve, by way of example, the reliability of commercial equipment performance and efficiency, and economy of equipment operation.

Another object of the invention as applied to commercial equipment is to provide control means in association with a washer, which thereafter will require for its proper operation a minimum of human intervention or attention, resulting in greatly improved efficiency and reliability of operation.

Another object is to provide simple yet effective control means so constructed that an attendant may not, through inexperience or error of judgment, depreciate the operativeness of the control means; moreover, the invention contemplates an arrangement whereby human interference with operation of the controls is discouraged, if not substantially precluded.

A further object of the invention is to provide a durable and trouble-free, corrosion-resistant automatic apparatus for controlling and automatically dispensing two or more liquid compounds which when blended in or just prior to their introduction to what will hereinafter be referred to as the working solution, said apparatus, including means for keeping one or more attendants constantly informed concerning certain conditions of the working solution, its potency, and the need for additive replenishment when low of supply.

A still further object of the invention is to provide improvement in the accurate feeding of concentrates or additives to the working solutions of various devices, with the purpose of eliminating waste and unnecessary expense.

The foregoing and other objects are attained by the means described herein and illustrated as applied to a commercial dishwasher upon the accompanying drawings, in which:

FIG. 1 is a front elevational view of a typical dishwasher, shown on greatly reduced scale, and having associated therewith the improved control means for supply of additives or concentrates to the washing solution.

FIG. 2 is a front elevational view of a dual pump unit forming a detail of the invention.

FIG. 3 is a wiring diagram for the dishwasher electrical components, and the electrical elements of the control means.

FIG. 4 is a schematic view of alternate means comprising a detail of the present invention.

FIG. 5 is a perspective view of a normally closed housing in which certain of the control means are contained.

The upper portion of FIG. 1 illustrates a typical washer, which by way of example, may be a dishwasher, of a type commonly used in restaurants, hotels, and other institutions. The washer shown is typical, and may comprise a motor-driven foraminous belt conveyor 10 upon which may be deposited at entry station 12, soiled dishes and tableware and other articles to the cleaned. The soiled articles may be advanced by the moving conveyor belt, from entry station 12 toward discharge station 14, where an attendant may be employed to remove the washed articles from the apparatus.

In the course of advancement, the soiled articles may pass successively through sections of the washer, identified as the pre-wash section 16, the wash section 18, the rinse section 20, and the final rinse section 22. In the pre-wash section 16, the articles are subjected to a forceful water spray or jet arrangement for dislodging the larger loose particles of food or soil, preparatory to entry of the articles into the wash section 18. In wash section 18, the articles are forcefully sprayed with a washing solution often containing an alkaline material and a bleaching or chlorinated material, in proper proportions technically predetermined on the basis of the nature and amount of the soil encountered, the character of the articles undergoing cleaning, the hardness and the temperature of the available wash water, the conveyor speed, and other factors necessarily to be considered. The control of the alkaline and bleaching materials, or additives, injected into the wash section during operation of the washer, is a matter of primary importance to the successful operation of the washer.

In the rinse section 20, the thoroughly washed articles are subjected to forceful hot-water sprays, which remove the washing solution therefrom; then the articles pass to the final rinse section 22, where the rinse water employed contains a predetermined quantity of a suitable wetting agent providing the desired finish to the washed articles. Addition of the wetting agent is subject to rigid control, as will be explained.

In connection with the foregoing, the wetting agent is delivered as a liquified concentrate, to a mixing head and siphon breaker 24 by way of a pipe or tube 25. Tube 26 may be of corrosion-resistive material, and has connection with a small adjustable-delivery corrosion-proof pump 28 that draws the concentrate from a replaceable container 30 by way of a pipe 32. Other containers 34 and 36 contain, respectively, the alkaline additive, and the bleaching or chlorinated material aforesaid, both of which are in dense liquid concentrate form. Materials from the containers 34 and 36 are withdrawn through tubes 38 and 40, and delivered to wash section 18 by way of separate discharge heads 42 and 44. Heads 42 and 44 may be located at any appropriate elevation within or above the wash section sump 46, and are supplied by tubes or pipes 43 and 45.

The reference character 48 indicates an electric motor driven pump for recirculating the wash solution of sump 46, over and about the articles on conveyor 10. At 50 is indicated conventionally a manifold incorporating suitable jets or nozzles supplied by pump 48. In like manner, the sump 52 of rinse section 20 may be provided with a recirculating pump 54 and nozzled manifold 56, for pressure-rinsing the washed articles. It may here be noted that sumps 46 and 52, as usual, have make-up water and drain connections so arranged that a normal level of liquid is maintained in the sump, notwithstanding a continuous or a periodic release of sump liquid to a sewer. By this arrangement, solids, and soil, along with some of the sump water, may be disposed of either continuously or periodically, throughout an extended operating period of the washer. As make-up water is added, in the case of the wash section sump, additives from containers 34 and 36 must be delivered to the wash section in order to maintain the predetermined specifications of the wash solution.

The pre-wash section 16, and the final rinse section 22, may drain directly to a sewer without the use of a sump or recirculating tank. Since the final rinse utilizes water from a tap or municipal supply, and is not recirculated, it must be treated with wetting concentrate from container 30 as long as the washer is in operation. As was previously mentioned, the wetting concentrate is driven by pump 28 to a mixer 24, continuously but in very limited quantity. The motor 58 of pump 28 is preferably wired to operate concurrently with the electric motor (not shown) which drives the washer conveyor 10. This is shown on the wiring diagram, FIG. 3, wherein pump motor 58 is seen to have connection with a 24 volt supply 60, involving the secondary winding a transformer associated with the starter coil of the motor which drives conveyor 10. Thus, wetting concentrate is fed to the final rinse water as long as conveyor 10 is activated. Final rinse water flows through mixer 24 during movement of the conveyor.

As was previously mentioned, the wash section 18 is supplied with additives from containers 34 and 36, by means of the separate discharge heads 42 and 44, respectively. The additive of container 34 may be withdrawn by means of a small pump 62 attached to tubes 38 and 43, and driven by an electric motor 64. Similarly, additive from container 36 may be withdrawn through tube 40 and forced through tube 45 and head 44, by means of a separate small pump 66 driven by an electric motor 68 (FIG. 2).

As FIG. 3 indicates, motors 64 and 68 are connected in parallel, and may be supplied with current by means of conductors 70 and 72 leading from a 24 volt transformer 74, whenever the relay switch 76 is in closed-circuit condition. By preference, transformer 74 is connected in the circuit of wash pump 48, so that current may be available to energize the motors 64 and 68 whenever the wash pump 48 is operative, provided that switch 76 is closed.

It is desirable, and necessary, that the flow of additives to outlets 42 and 44 be individually adjustable, so that as the motors 64 and 68 operate in unison, the amount of additive taken from container 34 may be caused to bear a definite proportional relationship to the amount of additive taken from container 36. The proportion of one additive to the other, is to be established by a technician who will determine the proportions most favorable to the performance of a satisfactory washing operation, taking into account various important considerations peculiar to the problem at hand.

For example, the proportionate amount of alkaline additive to the amount of chlorinated additive needed, may vary with the character of the water available for washing; also, a determining factor may be the nature and amount of soil to be removed, and the nature of the finish characterizing the articles to be washed, these being only a few of the factors the technician may take into account when determining the proportions of the additives required for obtaining maximum washing efficiency, economy and excellence.

As a highly satisfactory and effective means for proportioning the additives from containers 34 and 36, each of the pumps 64 and 68 may be of the variable capacity type, adjustable to produce any flow rate between zero flow and several ounces of material per minute. Such pumps are commercially produced by several manufacturers, one being known as the Series 1200 chemical feed pump, produced by Precision Chemical Pump Company, of Waltham, Mass. This is a diaphragm type pump driven by a constant speed electric motor, and including means to regulate the vibratory action of the diaphragm by means of an adjustable dial such as is indicated at 80, FIG. 2. The dial as shown may be calibrated from zero to 100, and by setting the dial at selected calibrations, the pump may be caused to very accurately move a liquid from zero rate to a rate approximating several ounces per minute. The pumps 62 and 66 are individually adjustable as to the rate of flow, and each may incorporate a driving motor, or if preferred, a single motor may drive both pumps. As shown herein, the pumps are driven by separate motors 64 and 68, and are constructed to effectively resist corrosion.

As best illustrated in FIG. 1 the additives from containers 34 and 36 are delivered to the work solution of the wash section through separate heads or nozzles 42 and 44, to avoid mixing the additives in advance of delivery to the section. This procedure ensures maximal cleaning and bleaching action upon the articles undergoing washing. It also avoids premature chemical interaction between the additive materials, tending to reduce their effectiveness in advance of treating the articles to be cleaned.

A control means is provided for opening and closing the relay switch 76 to energize and de-energize the pump motors 64 and 68, in accordance with demand for additives from containers 34 and 36, as the work solution becomes depleted or weakened in concentration. Such control means may include a pair of spaced electrodes 82 and 84 immersed within the work solution of sump 46, to pass electric current in amounts proportionate to the concentration of additive materials present in the solution. That is, a solution rich in additive materials will convey more current between the electrodes than will a solution containing a lesser amount of additive materials.

The electrodes 82 and 84 by means of electric conductors 86 and 88, are connected to the terminals 90 and 92 of a commercial conductivity meter 94 which, by means of a system of electrical components arranged therein, may effect opening or closing of the motor switch 76 controlling the additive pumps. The power conductors to switch 76 are denoted 96 and 98.

Power for activating the conductivity meter may be obtained from the secondary winding of transformer 74, which is energized whenever the wash pump motor 48 is in operation. Conductors 100 and 102 convey low voltage operating current (approximately 24 volts) to the terminals 104 and 106 of the conductivity meter, from transformer 74.

The conductivity meter circutiry is so designed, in accordance with common practice, that it will trip the relay of switch 76 to close said switch, whenever the resistance across electrodes 82 and 84 reaches a predetermined high value resulting from reduced electrolytic conductivity between the electrodes. That is, if the wash solution in which the electrodes are immersed suffers a loss of additive materials from containers 34 and 36, the circuitry of the conductivity meter will sense the resultant high resistance between the electrodes and cause a flow of current to activate the relay of switch 76, for closing said swtich and energizing the pump motors 64 and 68, thereby to promote a feed of additives to the work solution, and the feed of additives will continue until the solution in section 18 contains enough additive to reduce the electrical resistance between electrodes 82 and 84, to the extent that an electrical balance of the conductivity meter circuitry terminates current flow to the relay of switch 76, causing the switch to open and thereby de-energize the motors 64, 68 of pumps 62 and 66. The work solution will then be found correctly formulated.

The conductivity meter is provided with an adjusting screw 108 for altering the balance of its circuitry, whereby the technician setting up the washer for operation, may vary the point of additive concentration at which the motor switch 76 will be closed or opened. By this means, the desired normal strength of the work solution may be prescribed and selected by the technician. Conductivity meters are obtainable from General Specialties Company, of Cincinnati, Ohio, and from other sources.

The case of meter 94 may carry a signal lamp 110, preferably white in color, which is electrically connected in the circuit of the relay controlling motor switch 76, so as to indicate the closed or open conditions of said switch. By preference, signal lamp 110 will be energized whenever switch 76 is open-circuited, to indicate normalcy of the wash solution concentration obtaining when the additive pump motors 64 and 68 are at rest, as in FIG. 3. A second signal lamp 112, preferably red in color, may be mounted upon meter 94 to indicate, when lighted, an excessively high resistance to current flow between electrodes 82, 84. Such a condition might result from failure of additive to reach the sump of the wash solution, or perhaps failure of the sump to retain the wash solution. Either of these conditions would constitute a very serious fault, since articles would pass through the washer and emerge therefrom in very unsanitary condition.

The visual danger signal 112 just mentioned is desirably augmented by one or more audible signals such as a bell or buzzer 113 operative concurrently therewith. One such audible signal device may be encased within the housing of meter 94, and others might be strategically located elsewhere for attracting the attention of supervisory personnel. In FIG. 3, the reference character 114 indicates an adjusting screw on the housing of meter 94, for adjusting the amplitude of an audible signal device located within or upon the housing at 113. Also, at 116 is shown an auxiliary warning unit remote from conductivity meter 94, incorporating a white signal lamp 118 corresponding to lamp 110, and a red signal lamp 120 corresponding to lamp 110, and a red signal lamp 120 corresponding to lamp 112, said warning unit including also an audible signal device or buzzer. The warning unit 116 has electrical connection with the circuitry of conductivity meter 94, by way of conductors 122 and 124 entering the meter at terminals 126 and 128. Auxiliary unit 116 is adapted to produce the same danger signals as are produced by the lamps and buzzer of meter 94, but at a location remote therefrom.

In accordance with the present invention, the conductivity meter 94 and all control devices for the feeding of concentrates to the washer are to be situated at a location not readily accessible to persons unfamiliar with the technicalities of washer operation. Accordingly, the washer itself may be located near a kitchen or service area for the convenience of kitchen help or soiled tableware handlers. Such personnel may desirably have access to the usual electric push-button switches 130 for starting and stopping the washer conveyor and for other minor purposes.

So far as concerns the conductivity meter 94, its adjustments, and the pump adjustments for determining the flow rate of additives, these components may be remotely located and rendered entirely inaccessible to everyone excepting authorized persons trained in the field of washing solution formulation, by being located within a normally closed housing H, see FIG. 5, the interior of which housing is accessible only to authorized personnel having a key for lock D. When lock D has been unlocked one or moth of doors B and C may be opened by said authorized personnel—and after the necessary or desired adjustments are made said doors will be again closed and locked. In this way, operating results may be maintained at a high standard of excellence, with great reliability of performance and at minimal operating cost. It is a matter of common knowledge that control of additives for the wash solution, when left to the care and judgment of unskilled personnel, produces various problems and hazards which are highly objectionable and troublesome.

The containers of additives, indicated at 34, 36 and 30, may desirably occupy space remote from the washer and at a location of convenience for the replacement of containers as the contents are used up. When the supply of any material in such containers is exhausted, a full container is substituted for the empty one. The containers are quite large and heavy when full. The output pipes 38, 40 and 32 reach the bottoms of the containers and penetrate the tops thereof through bung openings.

It is considered desirable to provide means in the form of a signal device, for informing an attendant when the level of additive in the containers reaches a predetermined low point, so that arrangements may be made for timely replacement. Such signal device may comprise a signal housing or unit 132 containing a red lamp 134 and a blue lamp 136 representing, respectively, the containers 34 and 36. These lamps normally are de-energized, but are adapted to glow whenever the amount of additive in container 34 or 36 reaches a low level. Thus, lamp 134 will be energized whenever container 34 requires replenishment or replacement, and lamp 136 will be energized whenever container 36 requires replenishment or replacement.

For control of lamps 134 and 136, each container 34 and 36 may be receptive of a removable upright wand inserted through an opening in the container cover, each wand containing an electric switch. The wands are denoted 138 and 140, and at their lower ends may be housed the switches 142 and 144, FIG. 3. One switch may be series-connected to lamp 134, and the other to lamp 136 as indicated upon the wiring diagram, their circuits being energizable by low-voltage current produced at transformer coil 74 and supplied by way of conductors 100, 102, 143 and 145. As was previously explained, transformer coil 74 supplies low-voltage current only when the wash pump 48 is operative.

In a typical arrangement, switches 142 and 144 may be kept normally open-circuited by the weight or pressure of liquid surrounding them within containers 34 and 36. Then, as the liquid is depleted to a predetermined low level within a container, its associated switch is permitted to close and energize the accompanying signal lamp, thereby to indicate the need for replenishment. The signal unit containing the lamps 134 and 136 may be mounted at any convenient location for apprising an attendant as to the depletion of additives in containers 34 and 36. More than one signal unit may be employed, if desired.

In FIG. 1, the reference character 146 indicates an electric cable of any appropriate length, carrying conductors to the remote signal unit 132. Other cables are indicated by the reference characters 148 and 150. Reference character 152 denotes a supply pipe for final rinse water leading to the siphon breaker 24, at which the wetting agent may be introduced into the final rinse section of the washer.

In the wiring diagram of FIG. 3, the reference characters 154 and 156 denote multi-pronged plug and socket connectors for the various conductors shown. Similar connectors may be provided as shown, for application of the unit 132 and the warning switches 142, 144.

With reference to container 30, which supplies a liquified wetting agent to the final rinse section 22 of the washer, it may be noted that no signal device is suggested for indicating depletion of the wetting agent supply. A signal device for this purpose may be dispensed with, due to the slow rate at which wetting agent is used in the washer. The drum or container 30 accordingly requires infrequent replacement, and may therefore be checked with limited inconvenience. The containers 34 and 36, on the other hand, may require relatively frequent replacement, so that the employment of depletion indicators in connection therewith may be considered a great advantage to efficient and economical operation of the washer.

Although the apparatus as herein disclosed has been referred to as a dishwasher incorporating the control means of the present invention, it is to be understood that the invention is applicable as well to washing or cleansing machinery of other types and for other purposes, not necessarily related to the washing of dishes or tableware. The washer illustrated and described herein is exemplary only, and is not to be regarded as limiting the use of the inventnion.

With particular reference to FIG. 1 it should be understood that suitable check valves, not illustrated, are associated in connection with feed lines 43 and 45 to head or nozzles 42 and 44 in those instances where the heads or nozzles are disposed below the level of the solution in sump 46, as illustrated. In those instances in which the heads or nozzles 42 and 44 are located above the level of the solution, check valves may be omitted, unless required by the local ordinances.

As earlier indicated, the foregoing description of the subject invention as applied to a commercial dishwashing machine is merely exemplary of the manner in which the invention may be utilized for automatically controlling the introduction of two or more liquids which, when blended in or just prior to their introduction into a work solution, will provide the solution with certain desired characteristics which are literally tailor-made for the particular job to be accomplished by said solution. In other words, sump or receptacle 46 of FIG. 1 may, within the scope of the present invention, comprise the sump or receptacle containing the "work solution" of a water curtain; phosphatizing system; bakery utensil cleaning device; bottle washer; storage and truck tank cleaning system; car washing device; paint stripping unit; device for cleaning a paper mill felt; chain belt lubrication device; industrial sprayer or washer; steam cleaning equipment; and the like.

The present invention not only permits a technician to initially dispense precise quantities of two or more additives in any given ratio for providing an aptimum concentration of additives in the resultant work solution for any particular job; it also provides means for thereafter automaticaly maintaining the concentration of the work solution at a preselected value or within preselected limits; it likewise enables a technician to alter the quantity and/or ratio of the individual additives for thereby adjusting the composition of the work solution to maintain a maximum concentration for varying conditions occurring during operation of the device utilizing the work solution.

If desired two or more liquid additives even though not normally compatible, such as, by way of example, alkaline and bleaching materials may be suitably drawn from their respective storage containers and then delivered through a common conduit, of small diameter, to the work solution. Because of the relative short time during which such normally incompatible compounds are intermixed in the delivery conduit, the potency of said additives is not adversely effected nor is the overall ability of said additives to provide the work solution with the desired optimum concentration, adversely impaired.

The subject invention contemplates that the various additives may be independently transferred fronm their respective storage containers and then intermingled or blended just prior to being introduced into a work solution.

The subject invention further contemplates that means other than pumps may be utilized for transferring the various additives from their respective containers to a work solution, such as, by way of example, a gravity feed system; a siphonic system and/or a pressure head system. It will, of course, be understood that in any of the aforesaid three alternate systems means such as electrically operated solenoid valves are utilized to control the flow of additives from their respective storage containers for blending in or just prior to their introduction into the work solution. Likewise suitable metering devices such as needle valves, or the like are utilized for enabling a technician to regulate the relative quantities of additives supplied to the work solution incident to a flow of additives whenever the valves controlling the flow of additives are opened.

If a gravity feed system is used the storage containers for the additives would be placed at an elevation above the receptacle containing the work solution. When pumps or a pressure head is utilized to effect a flow of additives through their respective delivery conduits, the containers for said additives may be located above, below or on the same level as the work solution containing receptacle. Siphonic means may be utilized in those instances when the containers for the additives are located above or on the same level as the work solution containing receptacle.

The invention also contemplates that in certain instances two or more additives may be transferred from individual storage containers to a receptacle for the work solution by means of a single pump.

It will be noted that by whatever means the additives are introduced into the work solution, that the invention contemplates the continuous and automatic metering of the concentration of the work solution, said sensing means functioning to automatically initiate means for introducing additives into the work solution for thereby maintaining the concentration thereof at a prescribed value.

As used throughout the specification and claims the term work solution refers to the solution containing water and the various chemical additives in predetermined proportions for providing said solution with the desired characteristics for a particular job. In other words, the term "work solution" is used in a broad or generic sense to include a solution regardless of the particular use of the partisular device in which such solution is to be used.

With reference now to FIG. 4, an alternative or modified set up has been schematically disclosed wherein the numerals 200 and 202 denote a pair of pumps each of which may be simultaneously driven by a common motor 204, or in lieu thereof each pump may have its own separate driving means, such as motors 206 and 208. Additives for respective sources of supply may be delivered to the pump intakes via conduits 210 and 212, thence through the pumps, conduits 214, 216, valving means 218 and 220 thence through a common delivery conduit 222 to a work solution receptacle, not illustrated. The valving means 218 and 220 may be selectively set to deliver metered quantities of the respective additives in predetermined ratios. Said valving means may also be utilized to control the concurrent or alternate delivery of the additives to the common delivery conduit 222, and when operated to provide alternate delivery, the various additives may pass through conduit 222 in substantially unmixed, end-to-end relationship.

It should be understood that pumps 200, 202 may be constant displacement pumps, centrifugal pumps, or whatever particular type of pump would best be suited for the particular installation. Likewise valving means 218 and 220 may be so-called timber valves, solenoid actuated valves, manually operated valves, check valves, needle valves or the like depending upon the requirements of a particular installation.

The inventive concept also contemplates that in certain applications one of the liquid additives may be characterized as a high foamer, a medium foamer or a low foamer depending upon the requirements of the work solution for the particular job or application.

Further, it is to be understood that various modifications and changes may be made in the structural details of the disclosed device, within the scope of the appended claim, without departing from the spirit of the invention.

As used herein and in the claim, the term washing refers to the contacting of a solid or liquid surface by an aqueout solution containing certain chemical additives for the purpose of cleaning, lubricating, converting the surface from one form to another, such as in iron or zinc phosphatizing or the degradation of a surface such as in paint stripping, and the alteration of a paint surface so as to coagulate it and render it non-adherent.

What is claimed is:

1. The method of washing an article with a custom washing solution containing two or more normally incompatible liquid chemical ingredients while precisely maintaining within preselected narrow limits the optimum concentration of said custom washing solution, comprising the steps of providing a receptacle containing said custom washing solution having a preselected concentration of said ingredients, providing separate source for each of said normally incompatible liquid chemical ingredients in concentrated form, each of said sources being operatively connected through an ingredient moving means and an adjustable regulating means so said receptacle for individual flow from each of said sources to said receptacle, adjustably regulating the flow from each said source, continuously measuring the solution conductivity of said custom washing solution in said receptacle, distributing said custom washing solution from said receptacle over said article for chemically washing said article such that said washing solution drains back into said receptacle, thereby depleting the concentration of said ingredients in said custom washing solution and causing a lowering of said solution conductivity, and delivering each of said ingredients through said ingredient moving means in separate controlled amounts and in predetermined ratios with each other from their respective sources and discharging them separately directly into said custom washing solution in response to said solution conductivity lowering until the preselected concentration is restored.

References Cited

UNITED STATES PATENTS

| | | | |
|---|---|---|---|
| 1,885,201 | 11/1932 | Holley | 222—153 |
| 2,585,172 | 2/1952 | Reynolds | 222—309 XR |
| 2,697,673 | 12/1954 | Rice | 134—15 |
| 3,019,799 | 2/1962 | Douty | 134—57 |
| 3,094,247 | 6/1963 | Marchi | 222—54 |
| 3,134,070 | 5/1964 | Meyer | 134—57 XR |
| 3,136,903 | 6/1964 | Trott | 134—58 XR |
| 3,139,890 | 7/1964 | Moran | 134—72 XR |
| 3,195,551 | 7/1965 | Russell | 137—5 |
| 3,221,936 | 12/1965 | Spinuzza | 222—54 |

JOSEPH SCOVRONEK, Primary Examiner

J. T. ZATARGA, Assistant Examiner

U.S. Cl. X.R.

134—13, 36